(12) United States Patent
Bäckström et al.

(10) Patent No.: US 9,212,577 B2
(45) Date of Patent: Dec. 15, 2015

(54) DEVICE COMPRISING A CATION ION-EXCHANGER FOR REDUCING THE ACIDITY OF MOTOR OIL AND ENGINE WITH SUCH DEVICE

(75) Inventors: Daniel Bäckström, Uppsala (SE); Lena Höggren, Mariefred (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/239,680

(22) PCT Filed: Aug. 16, 2012

(86) PCT No.: PCT/SE2012/050875
§ 371 (c)(1),
(2), (4) Date: Mar. 5, 2014

(87) PCT Pub. No.: WO2013/028122
PCT Pub. Date: Feb. 28, 2013

(65) Prior Publication Data
US 2014/0202418 A1    Jul. 24, 2014

(30) Foreign Application Priority Data
Aug. 25, 2011    (SE) ...................................... 1150766

(51) Int. Cl.
*F01M 11/03* (2006.01)
*B01D 35/00* (2006.01)
(Continued)

(52) U.S. Cl.
CPC ............... *F01M 11/03* (2013.01); *B01D 27/00* (2013.01); *B01D 35/00* (2013.01);
(Continued)

(58) Field of Classification Search
CPC ... C10M 175/0091; F01M 11/03; F01M 9/02; F01M 2001/1014
USPC ............. 123/196 A, 196 R, 196 CP, 196 AM, 123/196 M, 196 S, 196 V, 196 W; 508/287, 508/100, 178, 266
See application file for complete search history.

(56) References Cited

U.S. PATENT DOCUMENTS 2,623,852 A * 12/1952 Peterson ........................ 508/136
6,667,285 B1 * 12/2003 Kawahara et al. ............ 508/485
(Continued)

FOREIGN PATENT DOCUMENTS

CN    101353973    1/2009
CN    101353974    1/2009
(Continued)

OTHER PUBLICATIONS

Machine translation of JP2011208584A, see "JP2011208584A_MachineTranslation.pdf" dated Oct. 2011.*
(Continued)

*Primary Examiner* — Lindsay Low
*Assistant Examiner* — Long T Tran
(74) *Attorney, Agent, or Firm* — Ostrolenk Faber LLP (57) ABSTRACT

A device 101 for reducing the acidity of motor oil for combustion engines, which device is part of the engine's lubrication system and contains monovalent cation exchanger 102, 202. It also relates to a method for regulating the acidity of motor oil whereby the oil is caused to pass through the acidity-regulating device. A vehicle is provided with the acidity-regulating device for motor oil.

12 Claims, 6 Drawing Sheets

(51) Int. Cl.
*B01D 27/00* (2006.01)
*F01M 9/02* (2006.01)
*C10M 175/00* (2006.01)

(52) U.S. Cl.
CPC .. *C10M 175/0016* (2013.01); *C10M 175/0091* (2013.01); *F01M 9/02* (2013.01); *C10N 2230/52* (2013.01); *C10N 2230/72* (2013.01); *C10N 2240/10* (2013.01); *C10N 2240/102* (2013.01)

(56) References Cited

U.S. PATENT DOCUMENTS

| | | | |
|---|---|---|---|
| 8,016,125 B2 * | 9/2011 | Lockledge et al. | 210/504 |
| 8,299,005 B2 * | 10/2012 | Poirier et al. | 508/501 |
| 8,642,524 B2 * | 2/2014 | Haigh et al. | 508/591 |
| 2006/0260874 A1 | 11/2006 | Lockledge et al. | |
| 2009/0139483 A1 * | 6/2009 | Lockledge et al. | 123/196 R |
| 2014/0001108 A1 * | 1/2014 | Fukutomi et al. | 210/167.04 |

FOREIGN PATENT DOCUMENTS

| | | | |
|---|---|---|---|
| GR | 1004835 B1 | | 3/2005 |
| JP | 2011208584 A | * | 10/2011 |
| WO | WO 2004/094381 A1 | | 11/2004 |
| WO | WO 2011/032163 A1 | | 3/2011 |

OTHER PUBLICATIONS

International Search Report dated Nov. 20, 2012 issued in corresponding International patent application No. PCT/SE2012/050875.

* cited by examiner

DEVICE COMPRISING A CATION ION-EXCHANGER FOR REDUCING THE ACIDITY OF MOTOR OIL AND ENGINE WITH SUCH DEVICE

CROSS-REFERENCE TO RELATED APPLICATIONS

The present application is a 35 U.S.C. §§371 national phase conversion of PCT/SE2012/050875, filed Aug. 16, 2012, which claims priority of Swedish patent application No. 1150766-2, filed Aug. 25, 2011, the contents of which are incorporated by reference herein. The PCT International Application was published in the English language.

TECHNICAL FIELD

The invention relates to a device for reducing the acidity of a motor oil, and an engine with such a device. The invention relates in particular to a device which uses ion exchangers to reduce the amount of hydrogen ions in a motor oil for a combustion engine of a heavy vehicle.

BACKGROUND

There are now high requirements for engines to discharge as little as possible of substances which are harmful to the environment, while at the same time it is desirable to lengthen the interval between servicing operations. For an engine to achieve this, the oil used for its lubrication and cooling has to meet high requirements. A properly functioning combustion engine consumes less propellant and discharges a smaller amount of substances which are harmful to the environment. To enable for example a combustion engine to discharge smaller amounts of pollutants it is desired to increase the pressure and temperature at which the combustion takes place. This involves still higher requirements for the engine's components, inter alia the motor oil. Engines of heavy vehicles are subject to particularly severe stresses in that they have to provide a very large amount of power to enable the vehicle to travel and carry its cargo in a desirable way.

Motor oil is used as lubricant in combustion engines. Contact with acid combustion gases acidifies this oil, which is thus degraded and may become corrosive, with consequent adverse effects both upon the its tribological (lubricating) characteristics and upon the surface layers of the lubrication system.

Various additives are used to improve motor oil characteristics, comprising inter alia acidity-regulating (buffering) additives, but also viscosity-regulating, anti-oxidant and wear-inhibiting additives to make it possible to cope with the high pressures and temperatures at which the engine operates. These additives are consumed over time and when their amount in the oil reaches a certain level the oil has to be changed. The consequences of additive consumption include impairment of the oil's tribological characteristics, and in the worst case the oil may cause corrosive wear of the components with which it comes into contact. The additives are important to enable the oil to perform its function in a desirable way but they also lead to increased levels of soot in the exhaust flow. Too high soot contents in the exhaust gases result in greater load on exhaust-cleaning components, e.g. the particle filter.

Ion exchangers are solid materials (insoluble matrices), often with a carbon/silicon-based fundamental structure, which have the ability to bind positive or negative ions (cation exchangers and anion exchangers respectively). A cation exchanger can capture positive ions of one kind while at the same time releasing positive ions of another kind. Similarly, an anion exchanger captures negative ions of one kind while at the same time releasing negative ions of another kind. The ions captured by/released from an ion exchanger are called counterions.

There is today a new technology, COT (clean oil technology), which continuously cleans the oil during operation. The system takes the form of a bypass duct and the oil passes not only through a fine-mesh particle filter which removes very small solid pollutants, but also through a vaporisation unit which separates liquid pollutants which are of lower vapour pressure than the oil. This technology does however not deal with the increasing acidity of the oil.

WO 2004/094381 A1 describes acidity regulation and monitoring of lubricating liquids used in air compressors of screw or centrifugal type. Lubricating liquids used in such a compressor are not subject to as aggressive an environment as motor oil and therefore do not have such a large content of additives or harmful particles. They are however subject continuously to a certain acid load and WO 2004/094381 A1 proposes that this be dealt with by using anion exchangers.

GR1004835B1 describes filtration and acidity regulation of motor oil by ion exchangers. The acidity regulation takes place in a separate device outside of the vehicle and the oil needs to be as clean as possible, i.e. with no additives or pollutants remaining in it. This means that the additives, which are expensive and distinguish a good motor oil from a less good one, are removed, but so too at the same time are other additives to the oil. The result will be a clean and relatively inexpensive bulk oil.

OBJECT OF THE INVENTION

An object of the invention is to deal with the problems of the state of the art. The invention aims in particular at proposing a device for reducing the acidity of a motor oil in an engine of a heavy vehicle, which device lengthens the oil's service life by removing the acidifying substances but without removing the advantageous additives. Another object is to propose such a device in the oil's normal flow.

SUMMARY OF THE INVENTION

According to the invention, the above objects are achieved with a device for reducing the acidity of motor oil, comprising a container through which a certain amount of oil can flow, which container contains an ion exchanger. The ion exchanger is a monovalent cation exchanger and the device is situated in the oil's normal flow.

The monovalent cation exchanger has the ability to bind positive ions. It will therefore bind free hydrogen ions from the motor oil, but without affecting the amount of additives, and can therefore lengthen the service life of the oil. The fact that the device contains a monovalent cation exchanger also makes it possible to use smaller amounts of additives in the motor oil, leading to a reduced amount of soot in the exhaust flow and to the oil being less expensive.

The fact that the container is situated in the oil's normal flow means that installing it involves no extra lines or devices. It is accommodated in a component already present in the lubricating oil system, obviating the problem of finding suitable space which otherwise commonly arises in engines, particularly engines for vehicles.

The interval between servicing operations also becomes longer if the oil's acidity can be reduced during operation of the engine and not only on the occasion of servicing. The engine can thus be in operation for a larger proportion of its service life. Where for example the engine is installed in a heavy vehicle used in commercial activity it is very important that the vehicle spend as little time as possible in workshops.

The additives may be regarded as an internally acting system through being part of the oil. In contrast, the cation exchanger according to the invention may be regarded as an externally acting system in that cation exchangers are in contact with the oil but are not part of its composition. The cation exchanger may be fixed in part of the engine's lubrication system and not accompany the oil's flow through the system.

According to an embodiment of the invention, the proportion of monovalent cation exchanger to the total amount of motor oil which is acidity-regulated in the device is up to 10 wt % and according to another embodiment it is up to 2 wt %. Low cation exchanger contents also result in reduction of the oil's acidity. The amount of oil which is acidity-regulated is the amount present in the lubrication system. The invention also works at higher cation exchanger proportions, e.g. up to 20 wt % or up to 25 wt %.

According to another embodiment of the invention, at least part, or the whole, of the walls of the container is provided with perforations, holes or semipermeable membranes. Parts or the whole of the container's walls may also be in mesh form. The cation exchangers are enclosed in a container to prevent the oil from being contaminated by them. It is not desirable for them to be free in the lubrication system but rather for them to be prevented from accompanying the oil round the system. For the oil to come into contact with the cation exchangers, the walls of the container need to be penetrable by the oil so that it can makes its way into the container and come into contact with the cation exchangers. When the oil is in contact with the cation exchangers, the hydrogen ions are exchanged for the counterions in the container. Providing the whole or parts of the container's walls with portions which are penetrable by the oil makes it easier for it to make its way into and out of the container. The proportion of the container's surface which allows motor oil in also affects how quickly the exchange of ions can take place.

According to a further embodiment of the invention, the container takes the form of the engine's oil filter housing, in which case the ion exchanger is integrated with the engine's ordinary oil filter. The fact that the oil filter is easy to change means that it is also easy to change the ion exchanger.

The invention relates also to an engine provided with a device for reducing the acidity of a motor oil, and a vehicle with such an engine.

DETAILED DESCRIPTION OF THE INVENTION

Figure 1:
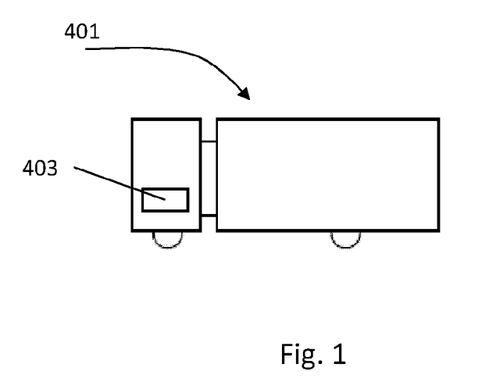
FIG. 1 depicts schematically a vehicle with an engine according to the invention.

FIG. 1 depicts a vehicle 401 with an engine 403 according to the invention. The vehicle depicted is a truck but might also be a works vehicle, a tractor unit or some other type of vehicle powered by combustion engine. The invention is also applicable to a freestanding engine, e.g. at a standby power plant, or to a watercraft engine.

Figure 2:
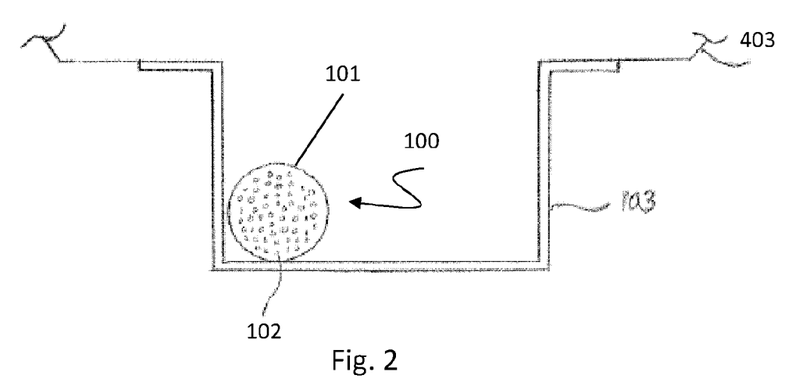
FIG. 2 is a schematic cross-section through an oil sump with a device according to the invention.

FIG. 2 is a cross-sectional view of a first embodiment of the invention. A device 100 for reducing the acidity of a motor oil is placed in the engine's oil sump 103. The device comprises a container 101 containing monovalent cation exchangers 102. The oil is pumped from the sump via an oil filter to the various consumer locations. The oil is thereafter returned to the sump. In cases where the device 100 is situated in the oil sump 103, it will therefore be in the oil's normal flow. The flow in the sump is relatively slow and locating the device there has little effect on the oil flow. It is desirable that the device 100 should affect the flow of the motor oil as little as possible, since it is important that the oil can reach the consumer points as undisturbed as possible.

The size of the container 101 may vary relative to the oil sump 103, and the size of the container in FIG. 2 is not to scale. A larger container will result in a relatively large outer surface of cation exchangers 102 for the oil to come into contact with. The volume of cation exchangers will also be quite large and the oil's penetration into the container will decrease with increasing container volume. This will reduce the rate of ion exchange and may also adversely affect the efficiency. A smaller container will have a smaller outer surface of cation exchangers for the oil to come into contact with. However, the oil's penetration will be greater and the cation exchangers' counterions will be consumed somewhat more quickly, not only because the cation exchanger volume is smaller in a larger container but also because the rate of exchange is maintained better in a smaller container.

Two or more containers may be placed in the oil sump 103.

At least part of the wall or walls of the container 101 may have perforations, holes 105 or semipermeable membranes, or at least part of the container's wall or walls may be in mesh form. The membrane needs to be penetrable by motor oil but must keep the monovalent cation exchangers inside. The whole of the container's wall or walls may have perforations, holes or semipermeable membranes or be in mesh form.

The size of the perforations, holes and mesh apertures also dictates how easy and/or rapid and efficient the exchange between motor oil and cation exchangers will be. Membrane permeability also affects how easy and/or rapid and efficient the exchange between motor oil and cation exchangers will be. The perforations, holes, membranes or mesh apertures have to be small enough to prevent the cation exchangers from making their way out through them. The monovalent cation exchangers may have a particle size of up to 40 µm. The particle size might for example be between 20 and 40 µm. The sizes of perforations, holes, membranes and apertures have therefore to be suited to the particle size of the monovalent cation exchangers.

The container 101 may for example be made of stainless steel, but other metallic or polymer materials are also conceivable, e.g. polyester. The choice of material for the container must cater for the aggressive environment in which the device 100 will be. The container may be made of latticed or perforated material to achieve the desired penetrability, i.e. allowing the oil to make its way in but not allowing the cation exchangers to make their way out. The whole or parts of the container walls may also take the form of a semipermeable membrane. Such a membrane allows only certain ions or molecules to pass through.

Figures 3A, 3B, 3C:
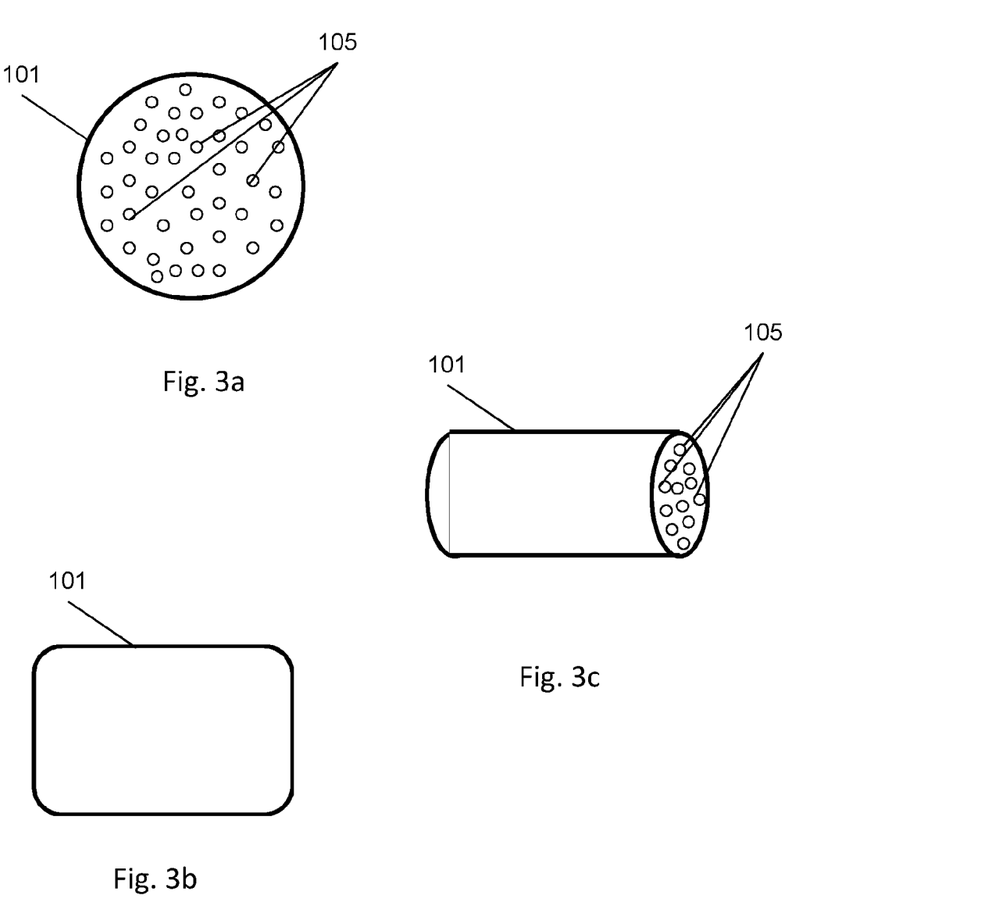
FIGS. 3a-3c depict schematically different variants of a container according to a first embodiment of the invention.

FIGS. 3a-3c depict different variants of the container 101. In FIG. 3a it takes the form of a sphere with small apertures 105 distributed over the surface of the sphere, but the surface might also be in mesh form or the like as described above. In FIG. 3b the container takes the form of a cylinder with small apertures 105 in its short sides. In FIG. 3c the container takes the form of a semipermeable membrane, with no visible apertures on its surface.

Figure 4A:
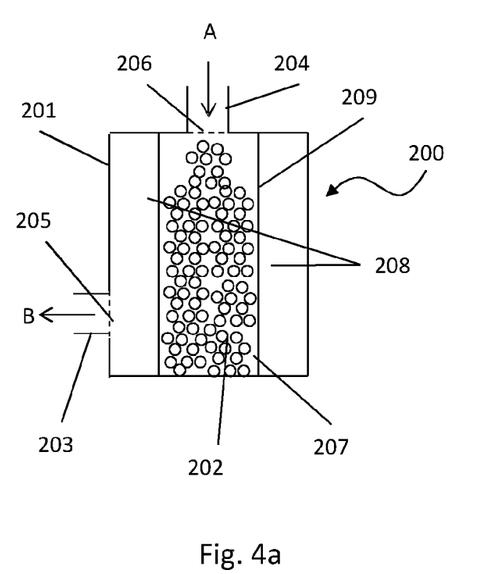
FIGS. 4a-4b depict schematically different variants of a container according to a second embodiment of the invention.
Figure 4B:
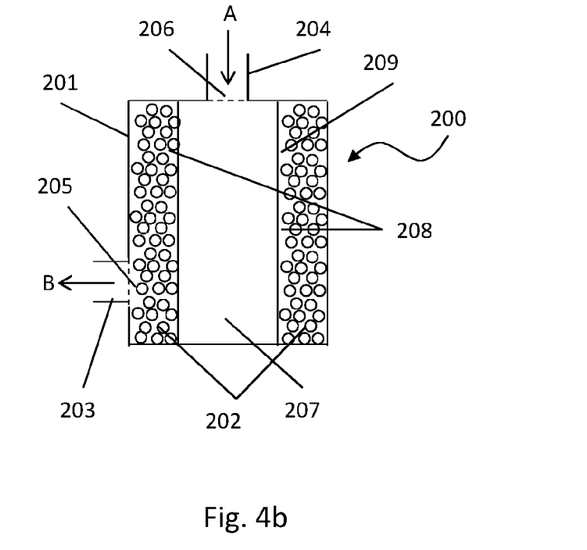

Another embodiment of a device 200 according to the invention is depicted in FIGS. 4a and 4b, in which the monovalent cation exchangers 202 are incorporated in a motor oil filter housing 201.

A motor oil filter 209 is provided in the filter housing 201, is often of cylindrical shape and may comprise a filter medium made up of cellulose fibres and/or synthetic fibres. The oil is filtered through the oil filter 209. The monovalent cation exchangers 202 may be placed in the same space 207 as accommodates the cylindrical oil filter 209, as depicted in FIG. 4a. The cation exchangers 202 may also be placed in the space 208 between the cylindrical oil filter 209 and the walls of the oil filter housing 201, as depicted in FIG. 4b. The cylindrical oil filter 209 may be corrugated, as is usual for oil filters. The filter housing 201 has an inlet 204 through which the oil enters in the direction indicated by arrow A. The oil then proceeds through the inner space 207 of the filter housing and out through the walls of the oil filter 209 to the outer space 208 of the filter housing and then proceeds out through the filter housing outlet 203 in the direction indicated by arrow B. A wall 206 with perforations, holes or meshwork may be provided in the filter housing inlet 204, and a wall 205 with perforations, holes or meshwork may be provided in the filter housing outlet 203, to keep the monovalent cation exchangers in the filter housing 201.

In the examples referred to above, a device 100, 200 according to the invention is placed in the oil sump 103 or is incorporated in the oil filter housing 201. It is also possible for the device according to the invention to be situated elsewhere in the oil's normal flow.

It is extremely important that additives to the oil do not interact with the ion exchanger and thereby be inactivated. To minimise the risk it is therefore necessary that the ion exchanger be a monovalent cation exchanger whole sole purpose is to capture hydrogen ions. Only monovalent cation exchangers may be used, since the additives might otherwise be changed into or be adsorbed on the ion exchanger. The monovalent cation exchanger will exchange the hydrogen ions in the oil for other kinds of ions which do not acidify. There may be other charged molecules as additives which are not to be exchanged in the oil but are to remain in it in order to maintain the function of the oil. If the oil was exposed to both anion exchangers and cation exchangers, its functions would be lost. The ion exchangers according to the invention therefore comprise only monovalent cation exchangers. The acidity-regulating device for the motor oil therefore comprises no anion exchangers.

The following are two examples of possible configurations of a cation exchanger:

R is the matrix to which the ion exchanger is bound and may be any matrix which works for an ion exchanger. Polystyrene may be cited as an example of such a matrix. The counterion in both cases is $Na^+$.

The ion exchanger may be a strong or weak cation exchanger. The $pK_a$ value is an equilibrium constant which expresses the pH at which there is equilibrium between the ion exchanger's protonised and deprotonised forms. This means that weak cation exchangers lose their charge at low pH, whereas strong cation exchangers maintain their charge. Strong cation exchangers have a $pK_a$ below 0, whereas weak cation exchangers have a $pK_a$ of between 0 and 7.

As the cation exchanger is monovalent, its counterions are also monovalent. The cation exchanger's counterions may be alkaline metals. The cation exchanger's counterions may for example be chosen between $Na^+$ and $K^+$. $Na^+$ and $K^+$ ions are currently often used in cation exchangers. The motor oil is acidified by contact with acid combustion gases, i.e. the oil's content of free hydrogen ions increases. A cation exchanger has the ability to bind these hydrogen ions, leading to a reduction in the acidity of the solution or oil and a higher base number.

Ion exchangers are regenerable and can therefore be used repeatedly, after regeneration. Regeneration means that the ion exchanger's ability to exchange ions is recreated. In purely practical terms, this is done by removing the ion exchanger from the engine and placing it in a basic solution with high salt content. A typical pH value for such a solution is 8-10. The ion exchanger may be placed in an unstirred bath or, more advantageously, a throughflow trough. The regeneration becomes more effective if the ion exchanger is placed in a throughflow trough. The amount of time required for the hydrogen ions to be exchanged and the exchanger to again become usable in an engine to reduce the oil's acidity will depend on the method chosen. In the case of a separate container containing the monovalent cation exchangers, the whole container may be removed from the engine and placed in the basic solution. This is a simple and rational way of regenerating the ion exchanger so that it can be reused.

It is also important that the ion exchanger can cope with high temperatures and pressures.

Figure 5:
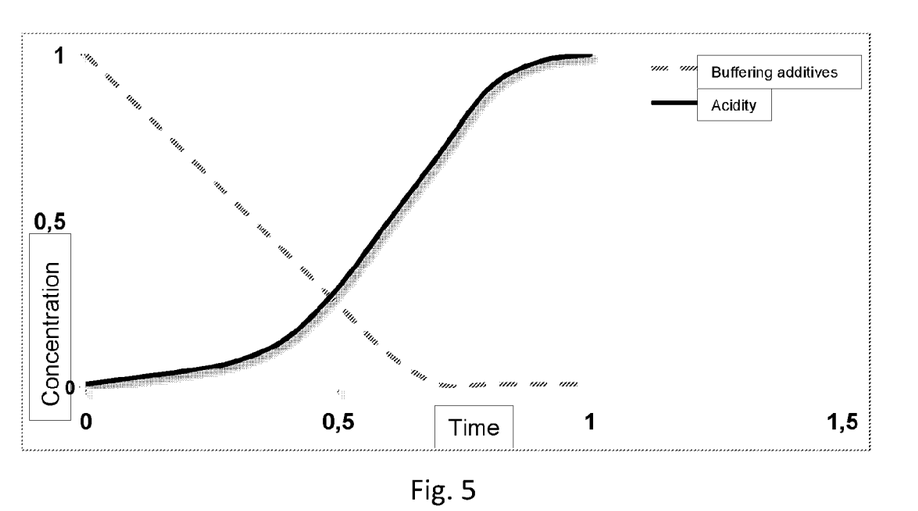
FIG. 5 illustrates graphically the pattern of the relationship between buffering additives and motor oil acidity.
Figure 6:
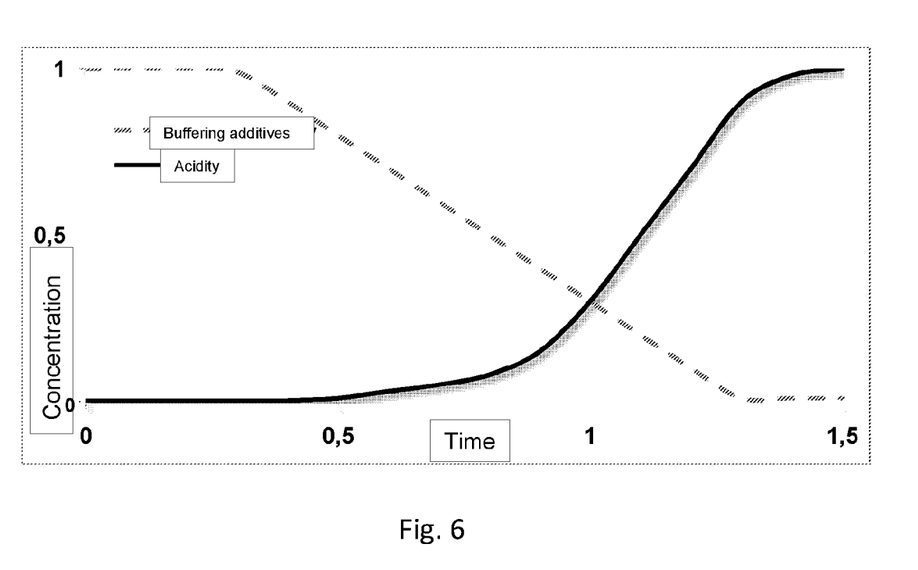
FIG. 6 illustrates graphically the relationship between consumption of buffering additives and motor oil acidity when cation exchangers according to the invention are used.
Figure 7:
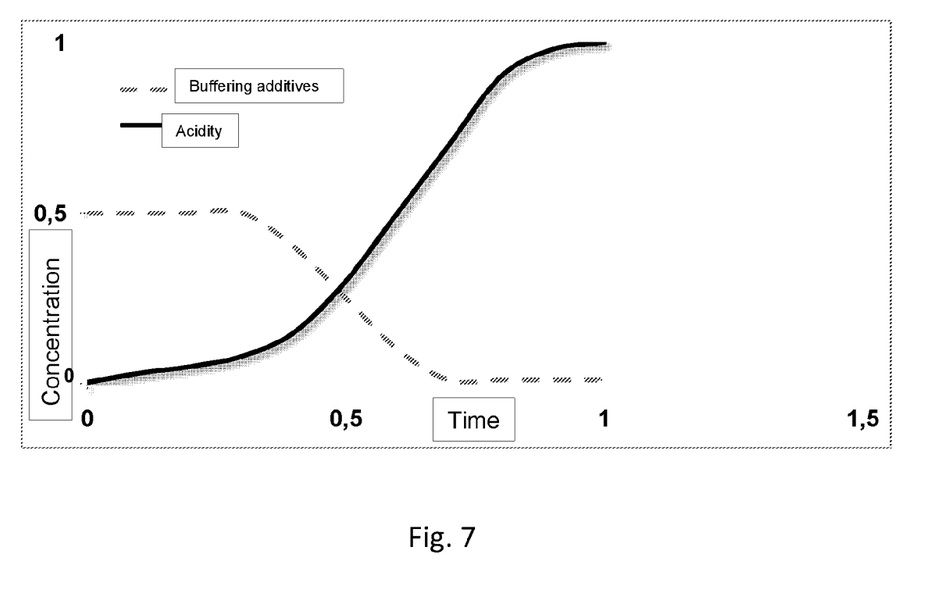
FIG. 7 illustrates graphically the relationship between consumption of buffering additives and motor oil acidity when cation exchangers according to the invention are used.

FIGS. 5-7 are described below to illustrate how cation exchangers can extend motor oil service life or by how much the additives in it can be reduced. In both diagrams the continuous curve represents the oil's acidity and the broken curve the amount of buffering additives.

FIG. 5 shows how buffering additives are consumed over time. So long as their amount is relatively high, the acidity of the oil remains within acceptable levels but rises quickly when the buffering additives are consumed. The figures on the y axis are not actual figures but are selected to make clear the relationship between buffering additives and acidity.

FIG. 6 illustrates the relationship between consumption of buffering additives and motor oil acidity when cation exchangers are used. Using cation exchangers as back-up to the buffering additives makes it possible to lengthen the oil's service life. This is achieved by the cation-exchanging material binding a certain amount of acid hydrogen ions and thereby lengthening the time before the buffering additives in the oil begin to be consumed. This may be seen from the fact that the two curves intersect after a longer time compared with the curve in FIG. 5.

FIG. 7 illustrates the relationship between consumption of buffering additives and motor oil acidity when cation exchangers are used. Using cation exchangers as back-up to the buffering additives makes it possible to reduce the amount of additives in the oil without affecting the length of its service life. This is achieved by the cation-exchanging material binding a certain amount of acid hydrogen ions and thereby lengthening the time before the buffering additives in the oil begin to be consumed. The same results are achieved by the same time as in FIG. 5 but with lower concentration of additives.

An example to illustrate the invention is described below.
Procedure

The ion exchanger was tested on a severely oxidised oil (used oil) with very low base number (TBN) and a comparison was also done with the same oil unused and with used oil without ion exchanger. Treated oil means oil treated with monovalent cation exchangers according to the invention as in items 1 and 2 below. Used oil means oil which has been in circulation in the lubrication system of a combustion engine.

1. 10 g of oil was weighed in, followed by adding 2.5 g of "Chicago Sky blue 6B" ion exchanger with CAS no. 2610-05-1. A magnet, a so-called flea magnet, was placed in the bottom of the container. A rotating magnetic field below the container was used to cause the magnet to rotate and thereby stir the liquid.
2. The specimen was left for 24 hours at room temperature with constant stirring.
3. The specimen was then centrifuged at 4000 rpm for 10 min.
4. About 1.6 g of the top phase, i.e. the uppermost layer of stratified liquid, was used for the TBN method according to ASTM D4739-02.
5. A somewhat modified variant of ASTM D4739-02 was used to determine the TBN. The differences between the methods are set out below.

| Chemicals | ASTM D4739-02 | Modified method |
| --- | --- | --- |
| Solvent for titration | 125 mL | 75 mL |
| 0.1M HCl with IPA | 100 μL | 60 μL |
| Total amount of 0.1M HCl with IPA | 4.0 mL | 4.0 mL |

Figure 8:
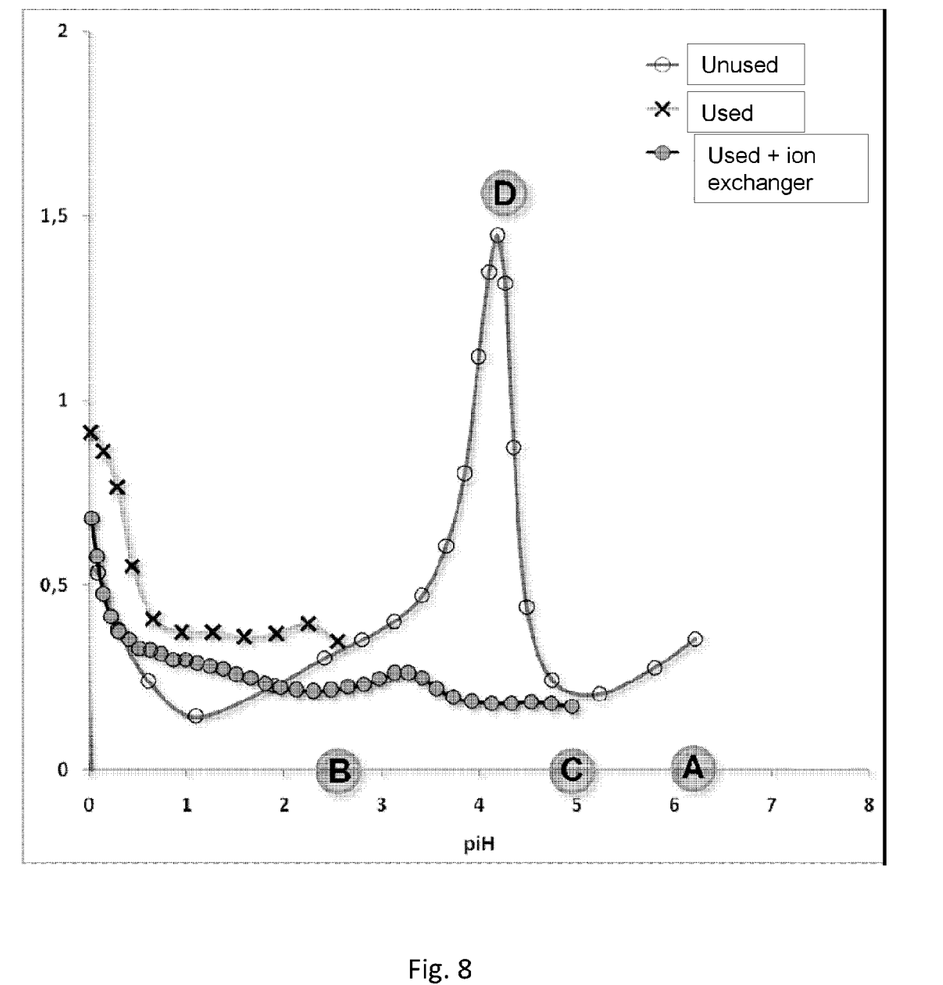
FIG. 8 is a diagram of an example according to the invention.

FIG. 8 illustrates the results of the tests with unused oil, used oil without cation exchangers and used oil with cation exchangers.

It illustrates the behaviour with regard to buffer capacity (titre curves) of unused oil, used (consumed) oil and used oil treated by the device according to the invention. piH is a value which expresses the acidity of an oil in a similar way to pH expressing the acidity of an aqueous solution. The x axis shows the piH value for the oils and the y axis their ability to buffer hydrogen ions, i.e. to absorb them without becoming more acid.

Each measurement point on the curves corresponds to the addition of a certain amount of acid (same amount for each point). In the case of the unused oil (original piH value about 6.3, see FIG. 8, A) there is a range around piH=4 (FIG. 8, D) within which the buffering effect is very good. When a certain amount of acid is added to this oil, the curve does not move so far along the x axis (the piH value does not drop appreciably), instead the acid is buffered and the curve moves along the y axis. The used oil already had a low piH value, about 2.5 (see FIG. 8, B) when the tests began, and each amount of acid added lowers the piH value (the curve moves towards a lower value on the x axis). No buffering is effected and the curve is therefore substantially stationary at the same value on the y axis. The third curve represents a consumed motor oil treated with monovalent cation exchangers according to the invention, which raise the piH value to about 5 (FIG. 8, C) as compared with the value of about 2.5 which this oil was at before the test began. The additives in the oil continue to be consumed and no buffering of acid takes place, the curve is substantially stationary along the y axis, but a larger amount of acid can be added before the piH value again reaches a lowest permissible level. Treating the oil with monovalent cation exchangers thus lengthens its service life.

The invention is of course in no way restricted to the embodiments described above, since many possibilities for modifications thereof are likely to be obvious to one skilled in the art without having thereby to deviate from the invention's basic concept such as is defined in the attached claims.

The invention claimed is:

1. A device for reducing the acidity of a motor oil, comprising:
    a container, wherein the container is configured to be situated in a position to receive motor oil carrying hydrogen ions; and
    monovalent cation exchangers in the container, wherein at least part of the container is penetrable by the motor oil to permit entry of the motor oil into the container, and wherein the monovalent cation exchangers capture hydrogen ions and exchange hydrogen ions in the motor oil with other ions that do not increase acidity of the motor oil.

2. A device according to claim 1, wherein weight of the cation exchangers is up to 10% of total weight of the motor oil that is subjected to monovalent cation exchange.

3. A device according to claim 1, wherein weight of the cation exchangers is up to 2% of total weight of the motor oil that is subjected to monovalent cation exchange.

4. A device according to claim 1, wherein the container has walls with perforations, holes or semipermeable membranes in at least part of the walls of the container.

5. A device according to claim 4, wherein the walls of the container are at least partly in mesh form.

6. A device according to claim 1, wherein the container has walls with perforations, holes or semipermeable membranes in the walls of the whole container.

7. A device according to claim 5, wherein all the walls of the whole container are in mesh form.

8. A device according to claim 1, wherein the container has the form of a motor oil filter housing usable in an engine.

9. An engine including a device according to claim 1.

10. A vehicle including an engine according to claim 9.

11. A device according to claim 1, wherein the container only contains monovalent cation exchangers.

12. A device according to claim 1, wherein the container does not include anion exchangers.

* * * * *